United States Patent Office 3,344,655
Patented Oct. 3, 1967

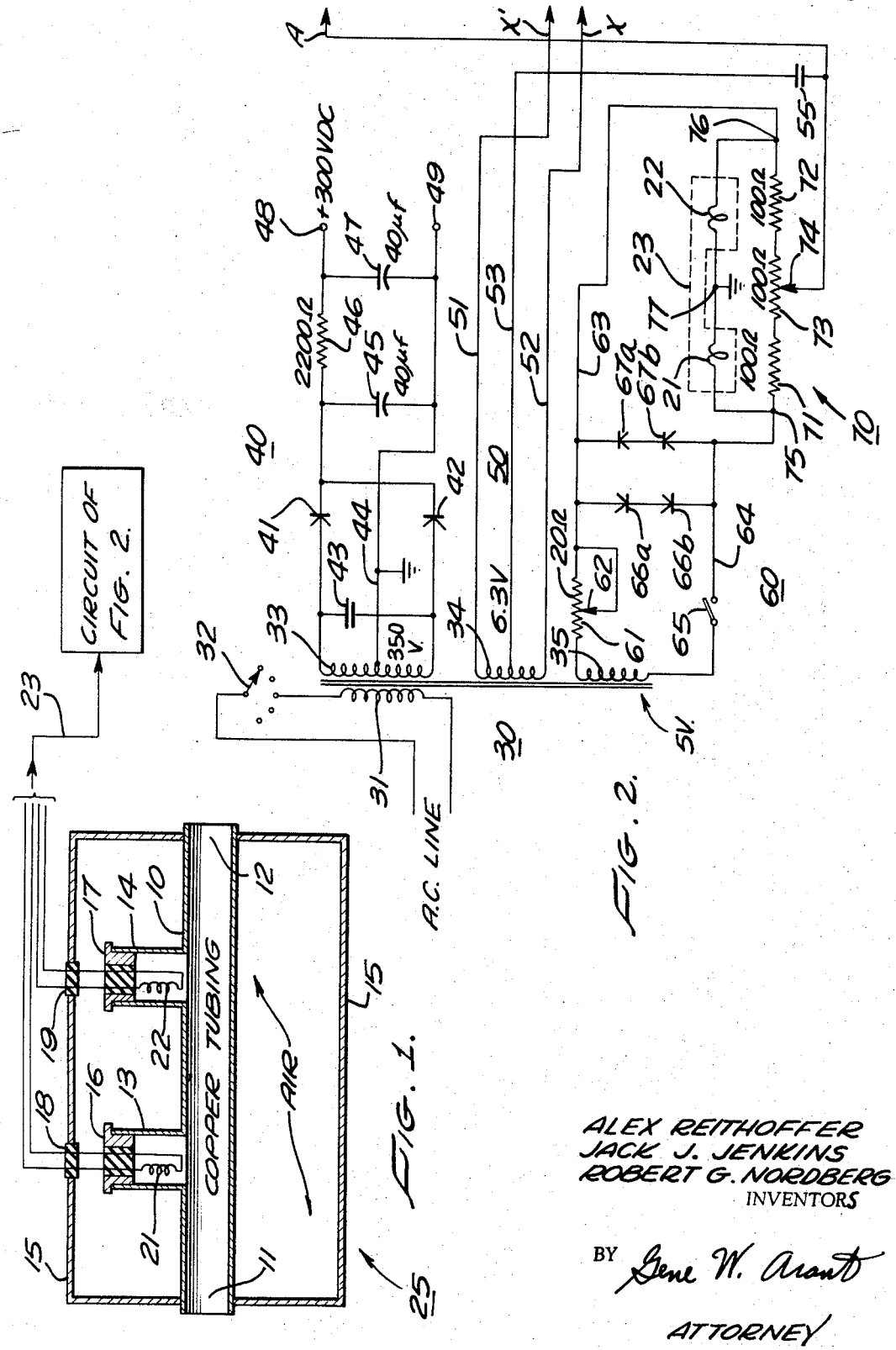

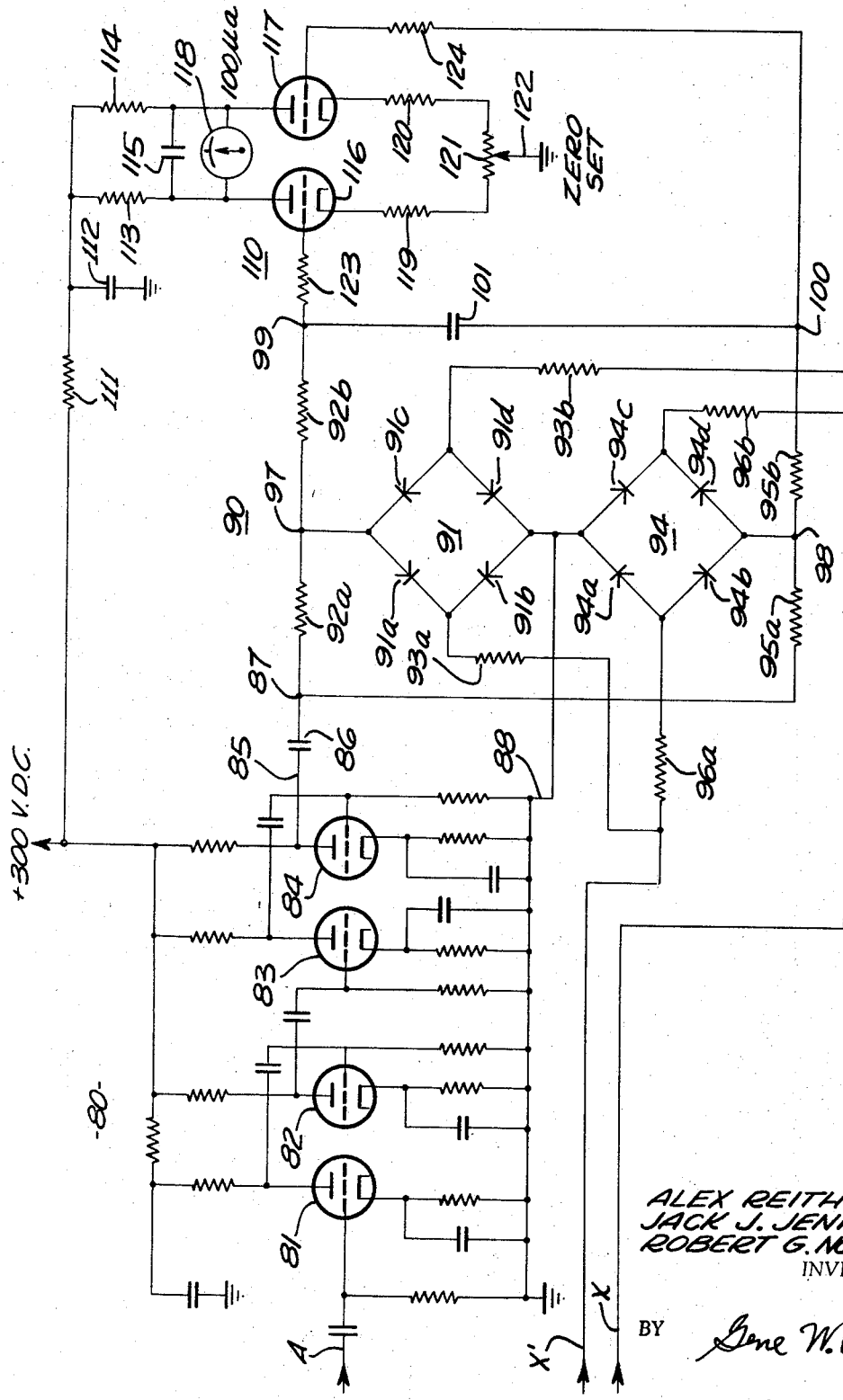

3,344,655
VACUUM LEAK DETECTOR
Robert G. Nordberg, 8939 Canby Ave., Northridge, Calif. 91324; Alex Reithoffer, 20334 Leadwell St., Canoga Park, Calif. 91306; and Jack J. Jenkins, 462 Stanford Place, Santa Barbara, Calif. 93105
Filed Dec. 17, 1963, Ser. No. 331,165
3 Claims. (Cl. 73—27)

The present invention relates to an alternating current bridge circuit which is characterized by high measurement sensitivity and freedom from noise.

Electrical bridge circuits of various types have long been used for diverse indication and measurement purposes.

The principal object of the present invention is to provide an electrical bridge circuit which is characterized by exceptional sensitivity and freedom from noise.

An additional and more specific object of the invention is to provide an improved vacuum leak detector.

The objects and advantages of the invention will be more fully understood from the following description considered in conjunction with the accompanying drawings, wherein:

FIGURE 1 is a cross-sectional view of the sensing head of a vacuum leak detector in conjunction with which the present embodiment of the bridge circuit invention may be utilized; and FIGURES 2 and 2A together are a schematic electrical circuit of the form in which the invention is presently used.

Referring now to FIGURE 1, the sensing head 25 used in vacuum leak detection is generally of the type described in an article by Minter entitled "Thermal Conductivity Leak Detector," Review of Scientific Instruments, volume 29, p. 793, September 1958.

The sensing head 25 includes an elongated copper tube 10 having open ends 11 and 12 which are coupled to corresponding portions of the vacuum system. Risers 13 and 14 rise upwardly from T joints integrally formed in the pipe 10. A hollow cylindrical shell 15 encloses the pipe 10 and risers 13 and 14 and provides an enclosed air space to protect the working part of the sensing head from externally induced sudden temperature changes. Insulating members 16 and 17 are seated in the upper ends of the respective risers 13 and 14, and each carries a pair of electrical conductors coupled to an associated sensing filament.

Thus a first sensing filament 21 is contained within the well formed by the riser 13 while a second filament 22 is contained within the well formed by the riser 14. The associated conductor pairs, after passing through the respective insulating members 16 and 17, also pass through insulating members 18 and 19 associated with the wall of the protective housing 15. The two pairs of conductors are then merged into a cable 23 which is coupled to the electrical circuit of the device, as shown in FIGURE 2.

In the circuit of FIGURE 2 a power transformer 30 has a primary winding 31 controlled by a switch 32 and coupled to the alternating current supply line. Separate secondary windings 33, 34, and 35, are used for separate purposes as will be explained.

A high voltage power supply 40 is energized from the secondary winding 33, and includes a pair of semiconductor diodes 41 and 42 whose anodes are coupled to respective ends of the winding 33, while their cathodes are tied together. A capacitor 43 is connected in shunt with the winding 33, and hence between the anodes of the two diodes 41 and 42. A ground lead 44 is connected to the center tap of winding 33. A resistor 46 whose value may, for example, be 2200 ohms, has one end thereof connected to the cathodes of the two diodes 41 and 42, while its other end is connected to a positive output terminal 48. A capacitor 45 is connected between the cathodes of the two diodes and the ground lead 44, while a capacitor 47 is connected between the output terminal 48 and the ground lead 44. Capacitors 45 and 47, for example, have a value of 40 microfarads, in the instance when a supply voltage of 300 volts D.C. is being supplied at the output terminals 48, 49.

A circuit 50 serves the double purpose of providing filament voltage for the vacuum tubes of an amplifier 80, subsequently to be described, and also providing a source of reference voltage for the double bridge circuit 90, to be described. Circuit 50 is energized from the secondary winding 34 having a nominal voltage of 6.3 volts. Leads 51 and 52, coupled to respective ends of the winding 34, are also designated as X′ and X, respectively. A lead 53 is coupled to the center tap of the winding 34 and is used for stabilizing or neutralizing purposes, as will be explained.

The basic measurement function of the circuitry is accomplished by a Wheatstone bridge 70. Power supply circuit 60 is especially designed to provide operating energy for the Wheatstone bridge 70. Power supply circuit 60 includes a resistor 61 coupled to one end of the secondary windnig 35, and having a variable tap 62 for varying the amount of its resistance included in the circuit. Secondary winding 35 has a nominal voltage of 5 volts A.C., resistor 61 has a maximum resistance value of 20 ohms, and it is desired to provide a driving voltage of approximately 0.80 volt for the two filaments 21 and 22, which are connected in series as shown in FIGURE 2. At the other end of winding 35 is coupled a switch 65, used for selectively opening the power supply circuit. On the output side of both the resistor 61 and the switch 65 a first pair of diodes 66a and 66b are connected in series across the circuit in one polarity, while a second pair of diodes 67a and 67b are connected in series across the circuit in the opposite polarity. The purpose of these diodes is to shunt and, hence, clip, the high amplitude portions of the sine wave which would otherwise appear at this portion of the circuit. A lead 63 connects the output side of resistor 61, the anode of diode 66a, and the cathode of diode 67a, to terminal point 76 of the bridge circuit 70. A lead 64 couples the output side of switch 65, the cathode of diode 66b, and the anode of diode 67b, to terminal point 75 of the bridge circuit 70. Due to the clipping action of the diodes 66 and 67 the voltage which appears across the terminals 75, 76, is a square wave which rises and falls fairly rapidly between a positive value of 0.80 volt and a negative value of 0.80 volt.

In the Wheatstone bridge 70 the dotted box 23 (corresponding to cable 23) indicates the remote physical location of the sensing filaments 21 and 22. Filaments 21 and 22 are connected in series between the bridge terminals 75 and 76, with their junction being grounded at 77. Also connected between the terminals 75 and 76, in a series arrangement, are resistors 71, 73, and 72. Each of these resistors has a value of 100 ohms. A center tap 74 which is movable on the resistor 73 represents the output of the Wheatstone bridge.

It will readily be seen that the filaments 21 and 22 constitute two legs of the Wheatstone bridge, and that an output signal will be generated whenever there is a differential between the resistance values of the sensing elements 21 and 22, provided of course that the movable tap 74 has been properly set in the first instance. In the leak detector application of the invention, a small amount of gas passing down the tube 10 will reach one of the wells 13 and 14, expand therein and provide a cooling effect on the associated filament, and will later pass to the other well and cause a similar cooling effect on the other filament. The cooling of the filament results in a reduction of its resistance value. Thus the passage of gas along the tube creates a momentary decrease in the resistance of first one filament, and later, of the other filament. The characteristic indication of the detector circuit is produced by an unbalance of the bridge 70 first in one direction, and then a moment later in the other direction.

Referring now to FIGURE 2A, a high voltage amplifier 80 includes four diode vacuum tubes 81, 82, 83, 84, which are coupled in series with conventional resistance-capacitance coupling circuits. Lead A connected to movable tap 74 of the Wheatstone bridge provides the input signal for amplifier 80, while its output signal appears on lead 85 connected to the plate of tube 84. A ground line for the amplifier is designated as 88.

The reason for including amplifier 80 in the circuit is that small output signals from the Wheatstone bridge, of the order of one or a few microvolts, cannot be accurately measured by the diodes of the phase discriminator 90, however, upon amplifying the signal to a larger value, of the order of a half volt or more, the phase discriminator circuit becomes fully effective.

Phase discriminator 90 includes a pair of bias terminals X' and X, a pair of signal input terminals 87 and 88, and two separate output terminals 99 and 100. Bias terminals X' and X are the leads connected to the two ends of secondary winding 34. Signal input terminal 88 is the ground line previously mentioned. A capacitor 86 couples the output lead 85 of amplifier 80 to the active signal input terminal 87 of the phase discriminator.

A first bridge rectifier 90 includes semi conductor diodes 91a, 91b, 91c, 91d. A first bias resistor 93a is coupled between bias terminal X' and one terminal of the bridge rectifier, being the common connection of the cathodes of 91a and 91b. A second bias resistor 93b is connected between bias terminal X and another bridge terminal, being the common connection of the anodes of 91c and 91d. The cathode of 91d and the anode of 91b are connected to ground lead 88. The anode of diode 91a and the cathode of diode 91c are connected to a terminal 97. A first isolating resistor 92a is connected between terminals 87 and 97 while a second isolating resistor 92b is connected between terminals 97 and 99.

A second bridge rectifier 94 is similarly constructed, but in reversed phase relationship relative to rectifier 91. Rectifier 94 includes diodes 94a, 94b, 94c, 94d. A third bias resistor 96a is coupled between bias terminal X' and one terminal of the rectifier, being the common connection of anodes of 94a and 94b. A fourth bias 96b is connected between bias terminal X and the common connection of the cathodes of 94c and 94d. The cathode of 94a and the anode of 94c are connected to ground lead 88. The cathode of 94b and the anode of 94d are connected to a terminal 98. A third isolating resistor 95a is connected between signal input terminal 87 and the terminal 98, while a fourth isolating resistor 95b is connected between terminal 98 and output terminal 100. A capacitor 101, coupled between the output terminals 99 and 100, completes the circuit of the phase discriminator.

The manner of operation of the phase discriminator is as follows. For an unbalance of the Wheatstone bridge in one direction its output signal on lead A is in phase with the bias voltage on lead X' while for an unbalance in the other direction these two voltages are out of phase. Since amplifier 80 has four stages its output signal on lead 85 is substantially in phase with its input signal on lead A. When the bias voltage on X' and the signal on lead 85 are in phase, the positive portion of the input signal at 87 passes freely to output terminal 99, being unaffected by the bridge rectifier 91, while the same positive signal on 87 in attempting to pass to the output terminal 100 is shorted out at 98 through the action of rectifier 94. When the signal at 87 then becomes negative the flow of bias current at the same time switches from rectifier 94 to rectifier 91, and the negative signal on 87 passes freely to output terminal 100 but is shorted out at 97 by the action of rectifier 91 in attempting to pass to output terminal 99.

Thus when the input signal and the bias voltage for the phase discriminator 90 are in phase with each other the positive portions of the input signal pass to output terminal 99 and the negative portions of the input signal pass to output terminal 100.

When the two signals are out of phase the negative portions of the input signal pass to output terminal 99 and the positive portions pass to output terminal 100.

Differential amplifier 110 includes triode vacuum tubes 116 and 117, whose plates are connected through plate load resistors 113 and 114, respectively. Driving power is obtained from the 300 volt source (circuit 40) through a dropping resistor 111 whose output end is shunted to ground by capacitor 112. Cathode load resistors 119 and 120 are connected to the cathodes of tubes 116 and 117, respectively, and a resistor 121 intercouples the negative ends of resistors 119 and 120. A variable tab 122, movable on the resistor 121, is grounded, and provides the zero set for differential amplifier 110. A capacitor 115 is coupled between the plates of the tubes 116 and 117. An indicating microammeter 118, having a scale which reads either positively or negatively from zero, is also coupled between the plates of tubes 116 and 117. A grid resistor 123 is coupled between terminal 99 and the grid of tube 116, while a grid resistor 124 is coupled between terminal 100 and the grid of tube 117.

The function of differential amplifier 110 is to respond to D.C. signals applied to both of its grids, and to indicate the difference between them. More specifically, in the circuit of the present invention, a positive D.C. signal is applied to one of the grids while a negative D.C. signal is applied to the other.

For proper operation of the phase discriminator 90 it is preferred that the magnitude of the input signal at 87 be less than the magnitude of the biasing voltage applied on X' and X. One side of whichever bridge is conducting is grounded at its center point, at 88, but the signal voltage at terminal 97 or 98 (as the case may be) may nevertheless rise to a positive value, depending upon the voltages applied, the value of the circuit resistors, and the characteristics of the diodes in the bridge rectifier. To effectively carry out the purposes of the invention it is desired that the conducting bridge effectively ground whatever positive signal is applied to it at terminal 97 or 98.

In the phase discriminator circuit 90 it has been found satisfactory to establish the following parameter values.

Semi conductor diodes type _____ E4__ 5
Bias resistors 93a, 93b, 96a, 96b _____ K ohms__ 15
Isolating resistors 92a, 92b, 95a, 95b ___ megohm__ 0.47
Capacitor 86 _____ mfd__ 0.25
Capacitor 101 _____ mfd__ 0.03

In accordance with the invention it has been found beneficial to include the capacitor 55, which couples the central tab of winding 34 to lead A, although the reasons therefor are not clearly understood. Possibly the capacitor 55 is useful in correcting undesired phase shift in the amplifier 80.

In using the apparatus of the present invention it is first necessary to zero the differential amplifier 110 by setting movable tap 122, and in order to do this the switch 60 is opened. Thereafter, after closing the switch 60, the movable tap 74 in Wheatstone bridge 70 is set to establish balance of the bridge, as indicated on the meter 118 of the differential amplifier.

The invention has been described in considerable detail in order to comply with the patent laws by providing a full public disclosure of at least one of its forms. However, such detailed description is not intended in any way to limit the broad features or principles of the in-

We claim:
1. A vacuum leak detector comprising, in combination:
an elongated tube having first and second test wells opening outwardly therefrom, and a pair of sensing elements disposed within respective ones of said test wells;
a Wheatstone bridge circuit including a pair of input terminals, first and second fixed resistance arms connected in series between said input terminals, said sensing elements being connected in series between said input terminals and being characterized by variation of their resistance values in response to a vacuum leak to be measured, and a pair of output terminals connected at the junctures between said first and second arms and said pair of sensing elements, respectively;
means for applying to said bridge input terminals a square-wave voltage of predetermined frequency and amplitude, whereby if said bridge is unbalanced there is produced at said output terminals a square-wave error signal whose polarity indicates the direction of unbalance and whose amplitude indicates the magnitude thereof;
an amplifier having an input coupled to said bridge output terminals, for amplifying said error signal;
means for generating a sine-wave reference voltage whose frequency is the same as the frequency of said square-wave signal and whose amplitude is substantially greater than the amplitude of said square-wave signal;
a phase comparison circuit having a pair of reference signal connections, a pair of error signal connections, and a pair of output terminals;
circuit means connecting the output of said amplifier to said error signal connections of said phase comparison circuit;
circuit means connecting said reference signal generator to said reference signal connections of said phase comparison circuit;
and an indicating meter connected to said output terminals of said phase comparison circuit, said indicating meter including indicating means which is deflectable in either of two directions so as to indicate the direction as well as the magnitude of unbalance of said Wheatstone bridge and thereby indicate a vacuum leak in one or the other of said test wells.

2. The instrument claimed in claim 1 including means for generating said square-wave voltage comprising a source of sine-wave voltage, a resistor connected to said source, a first semiconductor diode coupled in a series loop circuit with said signal source and said resistor, and a second semiconductor diode connected in parallel with said first diode but in reversed polarity relative thereto.

3. An instrument as claimed in claim 2 which includes a transformer having first, second, and third secondary windings, said first secondary winding providing a source of energizing potential for said amplifier, said second secondary winding being said sine-wave reference voltage generator, and said third secondary winding being said sine-wave voltage source; said second secondary winding having a center tap; and which further includes a capacitor connected between said center tap of said second secondary winding and one of said output terminals of said Wheatstone bridge.

References Cited

UNITED STATES PATENTS

| | | | |
|---|---|---|---|
| 2,562,912 | 8/1951 | Hawley | 324—87 |
| 2,697,787 | 12/1954 | Vosburgh | 324—91 X |
| 2,729,972 | 1/1956 | Schwidetzky | 324—87 X |
| 2,940,042 | 6/1960 | Fisher | 324—83 |
| 2,946,953 | 7/1960 | Boscia | 324—87 |
| 3,029,386 | 4/1962 | Ricker | 324—87 |
| 3,029,628 | 4/1962 | Minter | 73—27 |
| 3,121,843 | 2/1964 | Ule | 328—133 |
| 3,193,762 | 7/1965 | Wu | 324—62 |
| 3,239,828 | 3/1966 | Peterman | 73—27 X |

JAMES J. GILL, *Acting Primary Examiner.*

RICHARD C. QUEISSER, *Examiner.*

J. C. GOLDSTEIN, *Assistant Examiner.*